UNITED STATES PATENT OFFICE.

PHILIPP MÜLLER, OF VILBEL, GERMANY, ASSIGNOR TO HEINRICH FINKELSTEIN AND LUDWIG F. MEYER, OF BERLIN, GERMANY.

MANUFACTURE OF ALIMENTARY PRODUCTS.

1,075,720.　　　　　Specification of Letters Patent.　　Patented Oct. 14, 1913.

No Drawing.　　　Application filed January 20, 1912. Serial No. 672,472.

*To all whom it may concern:*

Be it known that I, PHILIPP MÜLLER, merchant, residing at Vilbel, near Frankfort-on-the-Main, Germany, have invented new and useful Improvements in the Manufacture of Alimentary Products, of which the following is a specification.

The method forming the subject of the present invention relates to the process of manufacturing a milk food low in salts and sugar but with a normal fat and casein content, especially adapted as a food for infants as described and claimed in the application for a patent Ser. No. 547772, and consisting in precipitating the curd mass from a given quantity of whole milk and mixing the same with a mixture of equal parts of buttermilk and water, the volume of the mixture being substantially equal to the volume of the whole milk from which the curd mass was precipitated. This method however is attended by the drawback that the whey separated from the mass of curd (casein and fat) leads away a certain part of the fat of the whole milk used. To overcome this drawback in the present method skim milk is used for precipitating instead of whole milk and a quantity of fat corresponding to the difference of fat of the whole milk and of the skim milk is added thereto. In using skim milk for precipitating the curd mass, the loss of fat caused by leading the fat away with the whey will be less than it is in using whole milk.

Example: Ten liters of skim milk are treated with rennet, the milk fat in a form as concentrated as possible obtained by centrifugal action or by souring is then added to the precipitated casein or to the casein mixed with buttermilk in such a quantity that the content of fat of the mixture corresponds to that obtained by treating whole milk with rennet. Furthermore it has been found that it is preferable to carry out the process in such a manner that only a half part by volume of buttermilk or skim milk is added to and mixed with the curd mass and fat, the quantity of water corresponding to the added quantity of milk from which the fat has been removed being added by the consumer himself immediately before using the food. This method of performing the process offers the advantage that, suppose the precipitation of curd mass being performed by treating the milk with rennet, the degree of acidity of the concentrated food will be such a favorable one that by this fact the stability of food is essentially greater as is the case with a food thinned with water from the first. Finally, the cost of the containers and of transportation will be reduced by one half.

It has been stated that the precipitation of curd mass (casein and fat) is most preferably performed by treating milk with rennet or a rennet-ferment, the precipitation by means of a suitable acid demanding the addition of an alkali for reducing acidity to a normal degree, but scientific investigations have shown that the stability of food as well as the assimilation of it by normal infants will be reduced by the addition of alkali. Finally in the manner before described the charges for transport of the food are depressed by one-half and the vessels diminished.

Having thus described my invention, what I claim and desire to secure by Letters Patent, is—

The herein described process of manufacturing a milk food low in salts and sugar but with a normal fat and casein content especially adapted as a food for infants, consisting in precipitating the curd mass from a given quantity of skim milk, adding fat to this precipitated curd mass and mixing the curd mass and the fat with milk from which the fat has been removed and water, the volume of each of these added ingredients being substantially equal to one half of the volume of the skim milk from which the curd mass is precipitated, substantially as and for the purpose described.

In testimony whereof I affix my signature in presence of two witnesses.

PHILIPP MÜLLER.

Witnesses:
　JEAN GRUND,
　CARL GRUND.

Copies of this patent may be obtained for five cents each, by addressing the "Commissioner of Patents, Washington, D. C."